(12) United States Patent
Chang et al.

(10) Patent No.: US 7,382,291 B2
(45) Date of Patent: Jun. 3, 2008

(54) NUMERIC KEYPAD HAVING KEYS ASSIGNED MULTIPLE-STROKES FOR IDEOGRAPHIC CHARACTER INPUT

(75) Inventors: Ying Y. Chang, Palo Alto, CA (US); Manjirnath A. Chatterjee, Sunnyvale, CA (US); Robert M. Harman, Palo Alto, CA (US)

(73) Assignee: Motorola, Inc., Schaumburg, IL (US)

( * ) Notice: Subject to any disclaimer, the term of this patent is extended or adjusted under 35 U.S.C. 154(b) by 892 days.

(21) Appl. No.: 10/879,977

(22) Filed: Jun. 29, 2004

(65) Prior Publication Data

US 2005/0289481 A1 Dec. 29, 2005

(51) Int. Cl.
*H03M 11/00* (2006.01)
(52) U.S. Cl. .................. 341/28; 345/171; 455/566; 400/484; 715/535
(58) Field of Classification Search .............. 341/20, 341/22, 28; 349/171; 455/566; 400/110, 400/484; 715/535
See application file for complete search history.

(56) References Cited

U.S. PATENT DOCUMENTS 6,362,752 B1 3/2002 Guo et al.
6,636,163 B1* 10/2003 Hsieh ..................... 341/28
6,766,179 B1* 7/2004 Shiau et al. ............ 455/566
2003/0027601 A1 2/2003 Guo et al.

FOREIGN PATENT DOCUMENTS

CN 1221906 A 7/1999

* cited by examiner

*Primary Examiner*—Albert K. Wong
(74) *Attorney, Agent, or Firm*—Hisashi D. Watanabe; Shigeharu Furukawa

(57) ABSTRACT

A numeric keypad (100) for entering ideographic characters is provided. The numeric keypad (100) comprises a first set of input keys (102) corresponding to numerals 1, 2, 3, 4, and 5, and a second set of input keys (104) corresponding to numeral 6, 7, 8, 9, and 0. Each of the first set of input keys (102) has a predefined single character stroke, which complies with the GB18031 standard. The second set of input keys (104) is assigned a first particular sequence of the predefined single character strokes and a second particular sequence of the predefined single character strokes different from the first particular sequence of the predefined single character strokes.

12 Claims, 6 Drawing Sheets

| KEY | PRIMARY STROKE | STROKE VARIATIONS |
|---|---|---|
| 1 | — | ╱ ╱ — ╱ ╱ — |
| 2 | │ | ╱ |
| 3 | ) | ) ) ) J ╱ ╱ |
| 4 | ╲ | ╱ ╱ ╲ ╱ ╱ ╲ ╲ ╱ |
| 5 | ┐ | ┐ ┐ ┐ ┐ ┐ 3 3 ┐ ┐ |

202　204　206

*1000*

| | | | |
|---|---|---|---|
| | 张 ←*1002* | | 5153154 ←*1004* |
| ㄱ | ㄱ | ㄱ | 5 |
| ㄱ | - | — | 1 |
| 弓 | ㇆ | ㄱ | 5 |
| 弓 | ／ | ノ | 3 |
| 弓 | 一 | — | 1 |
| 张 | ㇂ | ㄱ | 5 |
| 张 | ＼ | ＼ | 4 |
| *1012* | *1010* | *1008* | *1006* |

| NUMERIC KEY | MULTIPLE CHARACTER STROKES PRIMARY AND ALTERNATIVE |
|---|---|
| 6 | 12, 21 |
| 7 | 11, 44 |
| 8 | 25, 13 |
| 9 | 51, 15 |
| 0 | 31, 33 |

*1102*  *FIG. 11*  *1104*

NUMERIC KEYPAD HAVING KEYS ASSIGNED MULTIPLE-STROKES FOR IDEOGRAPHIC CHARACTER INPUT

FIELD OF THE INVENTION

The present invention generally relates to a keypad with assigned keys having strokes for Chinese characters, and more specifically to a numeric keypad having multiple-strokes assigned to some of the keys.

BACKGROUND OF THE INVENTION

To standardize input methods for selecting Chinese characters in mobile devices, the Chinese Government has promulgated a national standard, GB18031, for inputting Chinese characters, and a national standard GB18030 specifying available Chinese characters. Under the GB18031 standard, a numeric keypad of a mobile device has a set of predefined keys from 1 through 5, each of which has a particular Chinese character stroke associated with it. To select a desired Chinese character from the available Chinese characters, one or more of the GB18031 standard predefined numeric keys 1 through 5 are sequentially pressed and the corresponding strokes are entered. A set of Chinese characters matching the entered sequence of strokes is progressively narrowed after each stroke entry. The desired Chinese character is finally selected when a sufficient number of strokes to define the desired Chinese character has been entered such that the set of Chinese characters matching the entered strokes is small enough for a user to easily select the desired Chinese character. Although, the predefined numeric keys 1 through 5 of the GB18031 standard are adequate in selecting a desired Chinese character from the available Chinese characters, it requires multiple key strokes, each of which provides a single corresponding Chinese character stroke, to narrow candidate Chinese characters matching the entered stroke sequence sufficient enough such that a user can finally select the desired Chinese character.

BRIEF DESCRIPTION OF THE DRAWINGS

FIG. 10 is a table illustrating the Chinese character entry process demonstrated in FIGS. 4 through 9;

FIG. 11 is a table illustrating numeric key equivalents of the multiple-character-strokes assignments of the second set of input keys in accordance with at least one of the preferred embodiments;

DETAILED DESCRIPTION OF THE PREFERRED EMBODIMENTS

The numeric keypad, which complies with the national Chinese key entry standard, GB18031, provides an apparatus and method for entering Chinese characters into an electronic device. The GB18031 standard requires a standard key-mapping for numeric keys 1 through 5 of the keypad, each of which represents a single character stroke associated with Chinese characters. The numeric keypad has the numeric keys 1 through 5 in accordance with the GB18031 standard, but also has the numeric keys 6 through 9 and 0, each of which represent a combination, or multiple, of single character strokes assigned to the numeric keys 1 through 5. Because a desired Chinese character is selected by sequentially entering character strokes assigned to the numeric keys 1, 2, 3, 4, or 5, and narrowing available Chinese characters that match the entered sequence, assigning a set of multiple strokes to numeric keys 6 through 9 and 0 can reduce the number of times the numeric keys need to be pressed before the desired Chinese character is selected.

Figure 1:
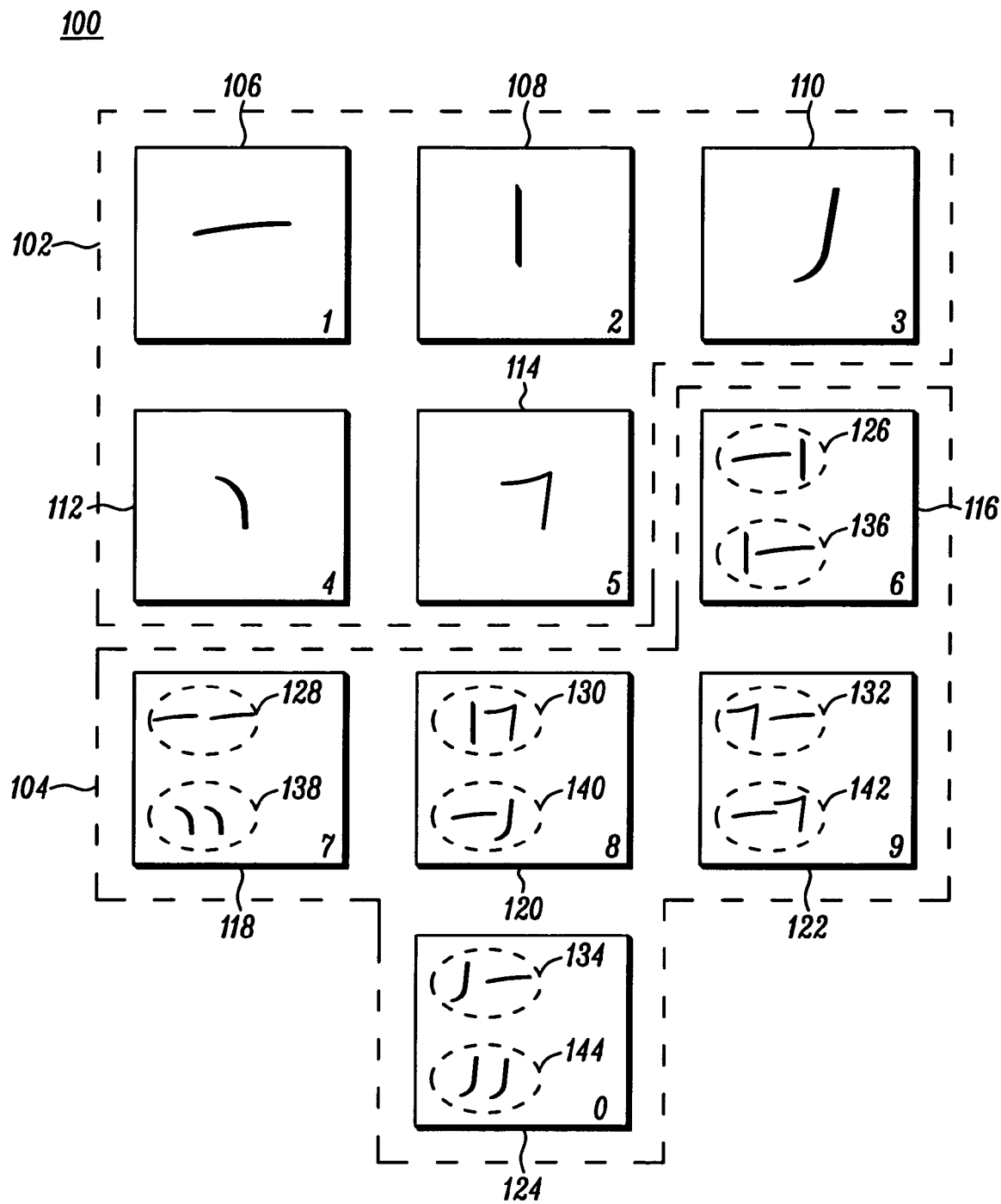
FIG. 1 is a block diagram of a numeric keypad for entering ideographic characters in accordance with at least one of preferred embodiments.

FIG. 1 is a block diagram of a numeric keypad 100 for entering ideographic characters in accordance with at least one of the preferred embodiments. The numeric keypad 100 can be used for entering ideographic characters in an electronic device such as a portable cellular telephone, a personal digital assistant ("PDA"), a personal computer, or any electronic device having a numeric keypad.

The numeric keypad 100 has a first set of input keys 102 and a second set of input keys 104. The first set of input keys 102 has keys 106, 108, 110, 112, and 114 corresponding to numeric 1, 2, 3, 4, and 5, respectively. Each key of the first set of input keys 102 is also assigned a single character stroke, which complies with the GB18031 national standard keypad layout for entering Chinese characters having the following stroke assignments: the numeral 1 key 106 having the substantially horizontal component "—" stroke called "heng"; the numeral 2 key 108 having the substantially vertical component "丨" stroke called "shu"; the numeral 3 key 110 having the leftward slant component "丿" stroke called "pie"; the numeral 4 key 112 having the dot component "丶" stroke called "dian"; and the numeral 5 key 114 having the clockwise angular component "┐" stroke called "zhe."

The second set of input keys 104 has keys 116, 118, 120, 122, and 124 corresponding to numeric keys 6, 7, 8, 9, and 0, respectively. Each key of the second set of input keys 104 is assigned a particular unique sequence of single character strokes assigned to the first set of keys 102. For example, the second set of input keys 104 in FIG. 1 is shown to have the following two-character-stroke assignments: the numeral 6 key 116 having "—丨" strokes 126 equivalent of pressing the numeral 1 key 106 then the numeral 2 key 108; the numeral 7 key 118 having "——" strokes 128 equivalent of pressing the numeral 1 key 106 twice; the numeral 8 key 120 having "丨 ┐"strokes 130 equivalent of pressing the numeral 2 key 108 then the numeral 5 key 114; the numeral 9 key 122 having "┐—"132 strokes equivalent of pressing the numeral 5 key 114 then the numeral 1 key 106; and the numeral 0 key 124 having ""丿 —"" strokes 134 equivalent of pressing the numeral 3 key 110 then the numeral 1 key 106. In FIG. 1, each of the second set of input keys 104 is also shown to have the following alternative two-character-stroke assignment: the numeral 6 key 116 having "丨-" strokes 136 equivalent of pressing the numeral 2 key 108 then the numeral 1 key 106; the numeral 7 key 118 having "丶 丶"strokes 138 equivalent of pressing the numeral 4 key 112 twice; the numeral 8 key 120 having "— 丿"strokes 140 equivalent of pressing the numeral 1 key 106 then the numeral 3 key 110; the numeral 9 key 122 having "— —┐" 142 strokes equivalent of pressing the numeral 1 key 106 then the numeral 5 key 114; and the numeral 0 key 124 having "丿 丿"strokes 144 equivalent of pressing the numeral 3 key 110 twice. Other combinations of the first set of input keys 102 may be assigned to the second set of input keys 104.

Figures 2, 3:
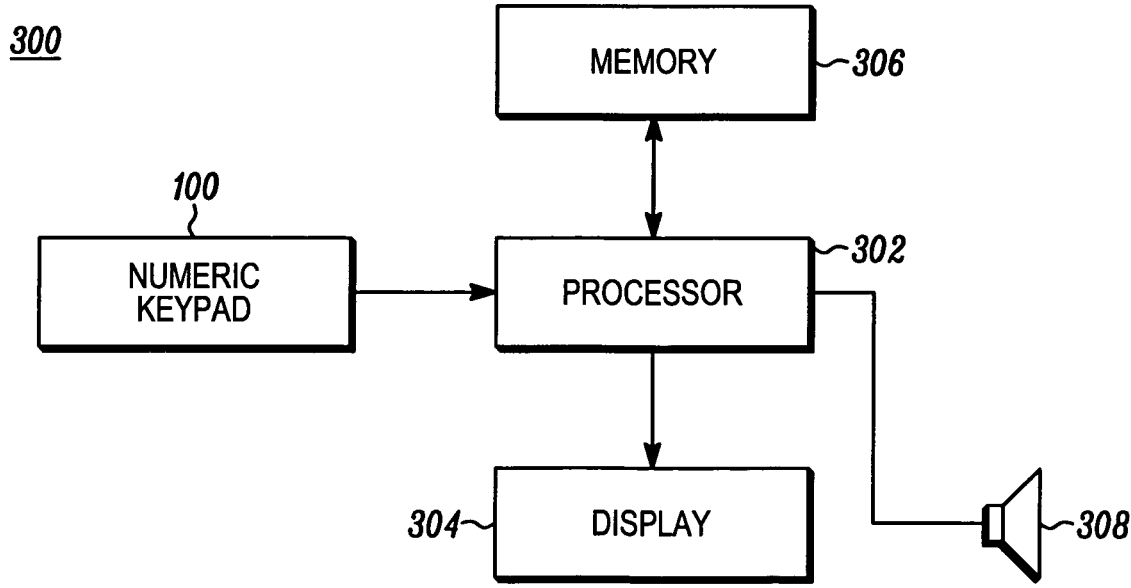
FIG. 2 is a table of primary Chinese character strokes and corresponding variations that may be associated with numeric keys 1, 2, 3, 4, and 5 in accordance with at least one of the preferred embodiments.
FIG. 3 is an exemplary block diagram of an electronic device having the numeric keypad in accordance with at least one of the preferred embodiments.

Each of the first set of input keys 102 may also represent at least one stroke variation as shown in a table 200 of FIG. 2. Each of numeric keys 202 has its primary Chinese character stroke 204 and at least one corresponding variation 206. Thus, stroke variations 206 may be interchanged with the corresponding primary stroke 204. Accordingly, the primary Chinese character strokes 204 and the corresponding stroke variations 206 represent the same character stroke.

FIG. 3 is an exemplary block diagram of an electronic device 300 having the numeric keypad 100 in accordance with at least one of the preferred embodiments. The electronic device 300 includes the numeric keypad 100, a processor 302, a display 304, and a memory portion 306. Optionally, the electronic device 300 may include an audio output device 308. The processor 302 receives data input signals from the numeric keypad 100 and processes these signals to generate ideographic characters or portions thereof on the display 304. The memory portion 306 includes volatile memory and non-volatile memory. The non-volatile memory includes tables of character strokes and ideographic characters, such as the primary character strokes and corresponding variations shown in FIG. 2. The processor 302 may utilize the volatile memory as general workspace for performing its calculations and functions.

Figure 4:
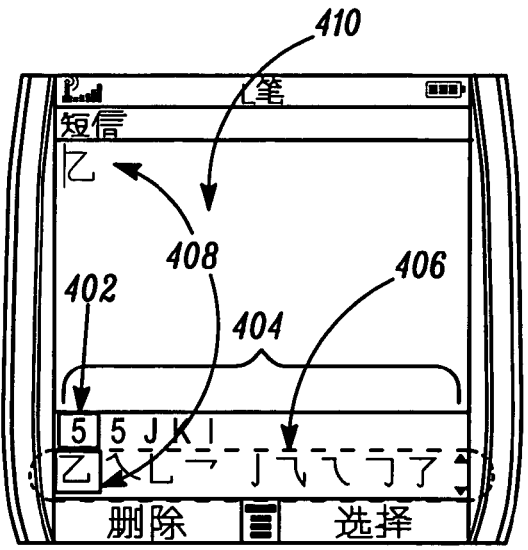
FIG. 4 is a screen view of an electronic device demonstrating an exemplary process of entering a Chinese character by using single-Chinese-character-stroke keys of a GB18031 compliant keypad after entering '5'.

FIGS. 4 through 9 are screen views of the electronic device 300 demonstrating an exemplary process of entering Chinese character "氷" by using the single-Chinese-character-stroke keys of a GB18031 compliant keypad. Using only the first set of keys 102 of the numeric keypad 100 of FIG. 1, it takes a sequence of six numeric entries, '515315' to enter the Chinese character "氷." FIG. 4 illustrates a screen view 400 after the numeral 5 key 114 is pressed. The entered stroke 402, which is the selection of the numeral 5 key 114, is shown in a stroke sequence area 404. Candidate characters matching the entered stroke are shown in a candidate area 406. The first Chinese character 408 of the candidate characters in the candidate area 406 is displayed in a main display area 410, and can be selected directly. Although nine characters are shown in the candidate area 406, there may be more characters matching the entered stroke that are not currently displayed but can be displayed by scrolling the candidate area 406.

Figure 5:
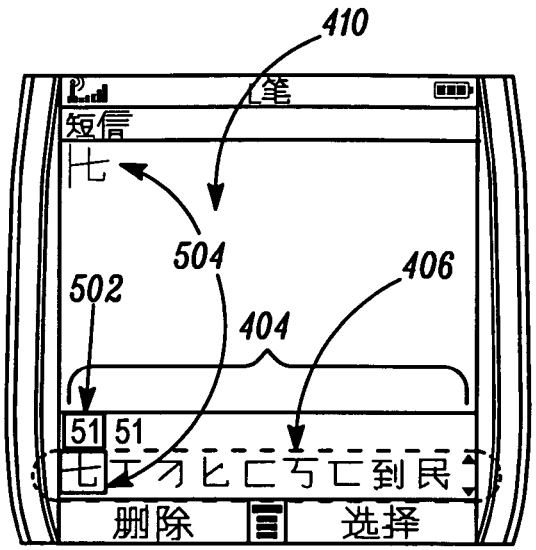
FIG. 5 is a screen view of an electronic device demonstrating an exemplary process of entering a Chinese character by using single-Chinese-character-stroke keys of a GB18031 compliant keypad after entering '51'.

FIG. 5 illustrates a screen view 500 after the numeral 1 key 106 is subsequently pressed. The entered stroke sequence 502 of '51' is shown in the stroke sequence area 404. Candidate characters matching the entered stroke are shown in the candidate area 406, and the first Chinese character 504 of the candidate characters in the candidate area 406 is displayed in the main display area 410.

Figure 6:
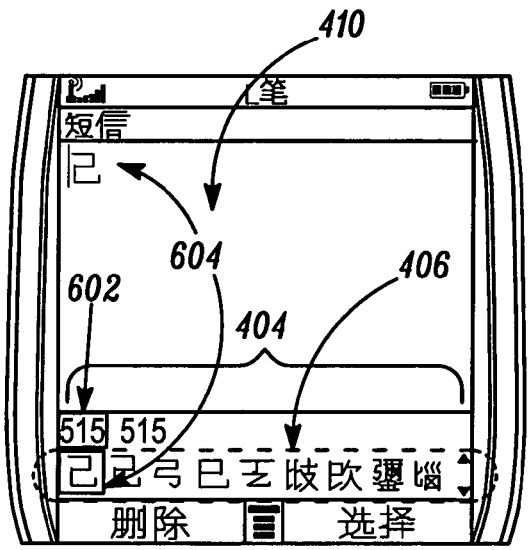
FIG. 6 is a screen view of an electronic device demonstrating an exemplary process of entering a Chinese character by using single-Chinese-character-stroke keys of a GB18031 compliant keypad after entering '515'.

FIG. 6 illustrates a screen view 600 after the numeral 5 key 114 is subsequently pressed. The entered stroke sequence 602 of '515' is shown in the stroke sequence area 404. Candidate characters matching the entered stroke are shown in the candidate area 406, and the first Chinese character 604 of the candidate characters in the candidate area 406 is displayed in the main display area 410.

Figure 7:
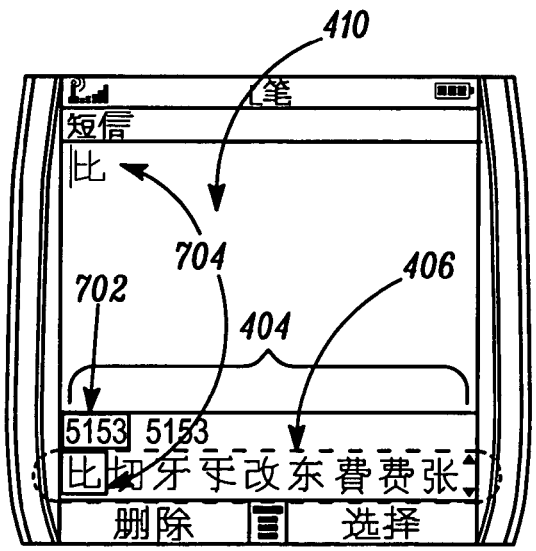
FIG. 7 is a screen view of an electronic device demonstrating an exemplary process of entering a Chinese character by using single-Chinese-character-stroke keys of a GB18031 compliant keypad after entering '5153'.

FIG. 7 illustrates a screen view 700 after the numeral 3 key 110 is subsequently pressed. The entered stroke sequence 702 of '5153' is shown in the stroke sequence area 404. Candidate characters matching the entered stroke are shown in the candidate area 406, and the first Chinese character 704 of the candidate characters in the candidate area 406 is displayed in the main display area 410. In this particular example, the desired Chinese character "氷"is now visible in the candidate area 406 as the last character displayed, and may be entered by navigating to it and selecting it. However, in order to select the desired character "氷"by using the single-Chinese-character-stroke keys of the GB18031 compliant keypad, a few more strokes are necessary.

Figure 8:
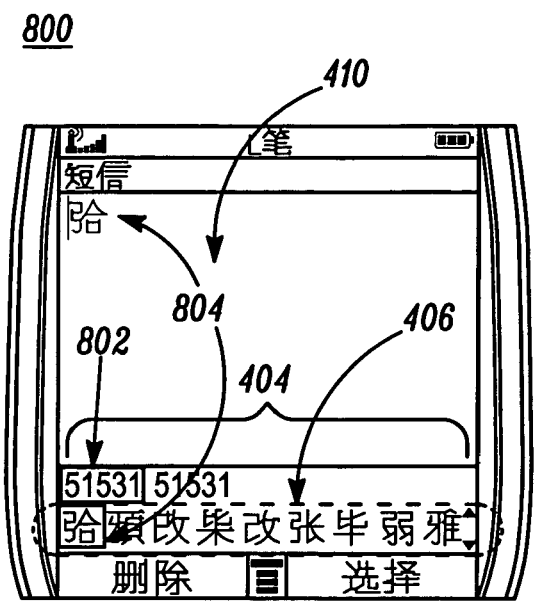
FIG. 8 is a screen view of an electronic device demonstrating an exemplary process of entering a Chinese character by using single-Chinese-character-stroke keys of a GB18031 compliant keypad after entering '51531'.

FIG. 8 illustrates a screen view 800 after the numeral 1 key 106 is subsequently pressed. The entered stroke sequence 802 of '51531' is shown in the stroke sequence area 404. Candidate characters matching the entered stroke are shown in the candidate area 406, and the first Chinese character 804 of the candidate characters in the candidate area 406 is displayed in the main display area 410.

Figure 9:
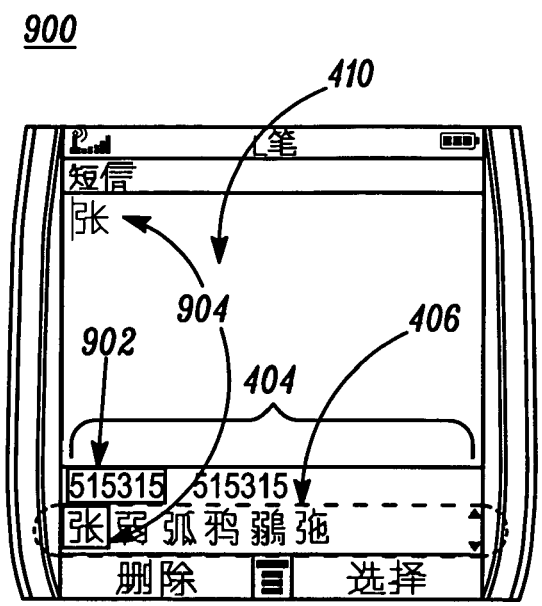
FIG. 9 is a screen view of an electronic device demonstrating an exemplary process of entering a Chinese character by using single-Chinese-character-stroke keys of a GB18031 compliant keypad after entering '515315'.

FIG. 9 illustrates a screen view 900 after the numeral 5 key 114 is subsequently pressed. The entered stroke sequence 902 of '515315' is shown in the stroke sequence area 404. Candidate characters matching the entered stroke are shown in the candidate area 406, and the first Chinese character 904 of the candidate characters in the candidate area 406 is displayed in the main display area 410. Because the desired Chinese character "氺"is the first Chinese character 904 displayed and is displayed in the main display area 410, the desired Chinese character "氺"can now be directly selected and entered.

FIG. 10 is a table 1000 illustrating the Chinese character entry process demonstrated in FIGS. 4 through 9 using the single-Chinese-character-stroke keys of a GB18031 compliant keypad for entering the desired Chinese character "氺"1002, which requires the sequence of '5153154' numeric key entries 1004. Entries in column 1006 represent the numeral keys selected, and entries in column 1008 represent the single character strokes corresponding to the selected keys. Entries in column 1010 represent actual strokes used based upon the entered strokes, and entries in column 1012 represent a stroke-by-stroke construction of the desired Chinese character 1002.

FIG. 11 is a table 1100 illustrating numeral key equivalents of the multiple-character-strokes assignments of the second set of input keys 104. Entries in column 1102 represent the numerals of the second set of input keys 104, and entries in column 1104 represents primary multiple-character-strokes assignments of the corresponding second set of input keys 104 based upon numeral key equivalents of the first set of input keys 102 as previously described and alternative multiple-character-strokes assignments. The primary and alternative numeral key equivalents for the second set of input keys 104 are as follows: '6' is '12' and '21'; '7' is '11' and '44'; '8' is '25' and '13'; '9' is '51' and '15'; and '0' is '31' and '33'. Based upon this set of multiple-character-strokes assignments, the required sequence of the single character strokes of '515315' for the desired Chinese character "氺"can be reduced to '9505'.

Figure 12:
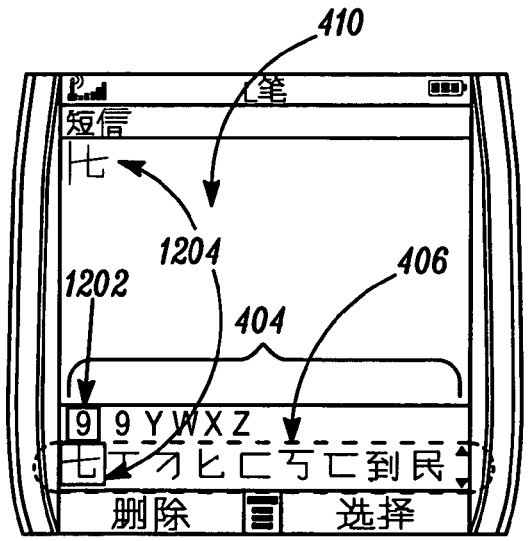
FIG. 12 is a screen view of an electronic device demonstrating an exemplary process of entering a Chinese character by using a GB18031 compliant single-Chinese-character-stroke keys and the multiple-character-stroke keys in accordance with at least one of the preferred embodiments after entering '9'.

FIGS. 12 through 15 are screen views of the electronic device demonstrating an exemplary process of entering Chinese character "氺"by using the numeric keypad 100 having the single-Chinese-character-stroke keys of the GB18031 standard and the multiple-character-stroke keys of FIG. 11 in accordance with at least one of the preferred embodiments. FIG. 12 illustrates a screen view 1200 after the numeral 9 key 122 is pressed. The entered stroke 1202, which is the selection of the numeral 9 key 122, is shown in the stroke sequence area 404. Candidate characters matching the entered stroke are shown in the candidate area 406, and the first Chinese character 1204 of the candidate characters in the candidate area 406 is displayed in the main display area 410. Although nine characters are shown in the candidate area 406, there may be more characters matching the entered stroke that are not currently displayed but can be displayed by scrolling the candidate area 406.

Figure 13:
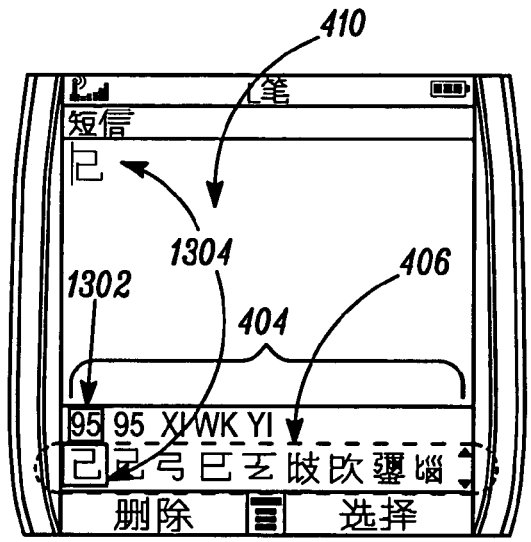
FIG. 13 is a screen view of an electronic device demonstrating an exemplary process of entering a Chinese character by using a GB18031 compliant single-Chinese-character-stroke keys and the multiple-character-stroke keys in accordance with at least one of the preferred embodiments after entering '95'.

FIG. 13 illustrates a screen view 1300 after the numeral 5 key 114 is subsequently pressed. The entered stroke sequence 1302 of '95' is shown in the stroke sequence area 404. Candidate characters matching the entered stroke are shown in the candidate area 406, and the first Chinese character 1304 of the candidate characters in the candidate area 406 is displayed in the main display area 410.

Figure 14:
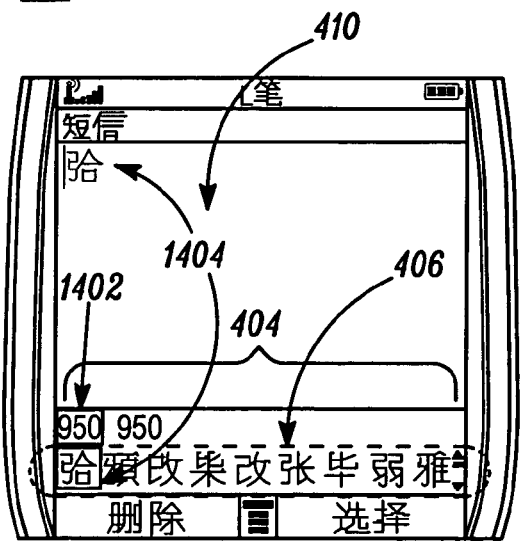
FIG. 14 is a screen view of an electronic device demonstrating an exemplary process of entering a Chinese character by using a GB18031 compliant single-Chinese-character-stroke keys and the multiple-character-stroke keys in accordance with at least one of the preferred embodiments after entering '950'.

FIG. 14 illustrates a screen view 1400 after the numeral 0 key 124 is subsequently pressed. The entered stroke sequence 1402 of '950' is shown in the stroke sequence area 404. Candidate characters matching the entered stroke are shown in the candidate area 406, and the first Chinese character 1404 of the candidate characters in the candidate area 406 is displayed in the main display area 410. In this particular example, the desired Chinese character "氺"is now visible in the candidate area 406 as the sixth character from the left, and may be entered by navigating to it and selecting it. However, in order to select the desired character "氺"by using the numeric keypad 100, a few more strokes are necessary.

Figure 15:
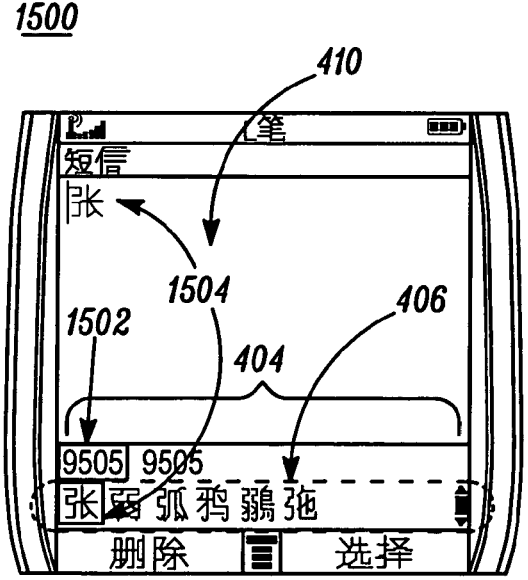
FIG. 15 is a screen view of an electronic device demonstrating an exemplary process of entering a Chinese character by using a GB18031 compliant single-Chinese-character-stroke keys and the multiple-character-stroke keys in accordance with at least one of the preferred embodiments after entering '9505'.

FIG. 15 illustrates a screen view 1500 after the numeral 5 key 114 is subsequently pressed. The entered stroke sequence 1502 of '9505' is shown in the stroke sequence area 404. Candidate characters matching the entered stroke are shown in the candidate area 406, and the first Chinese character 1504 of the candidate characters in the candidate area 406 is displayed in the main display area 410. Because the desired Chinese character "氺"is the first Chinese character 1504 displayed and is displayed in the main display area 410, the desired Chinese character "氺"can now be directly selected and entered. Thus, a sequence required to select the Chinese character "氺"has been reduced from six entries "515315" to four entries '9505'.

As it has been illustrated using the Chinese character "氺"as an example, by using the numeric keypad 100, which complies with the GB18031 standard and also has multiple-character-stroke keys, the sequence of the numeric key entries required to select the Chinese character "氺" is reduced to four key entries from six key entries required if only the single stroke keys of a GB18031 standard numeric keypad were used.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A numeric keypad for entering ideographic characters, the numeric keypad comprising:
    a first set of input keys corresponding to numerals 1, 2, 3, 4, and 5, each of the first set of input keys for entering a predefined single character stroke; and
    a second set of input keys corresponding to numeral 6, 7, 8, 9, and 0, wherein at least one of the second set of input keys is assigned a first particular sequence of the predefined single character strokes and a second particular sequence of the predefined single character strokes different from the first particular sequence of the predefined single character strokes wherein the at least one second input key enters either the first or the second particular sequence.

2. The numeric keypad of claim 1, wherein each of the first particular sequence and the second particular sequence of the predefined single character strokes comprises two predefined single character strokes.

3. The numeric keypad of claim 1, wherein each of the second set of input keys is assigned a first particular sequence of the predefined single character strokes and a second particular sequence of the predefined single character strokes, wherein each of the first particular sequences and the second particular sequences of the predefined single character strokes is unique.

4. The numeric keypad of claim 3, wherein each of the first particular sequences and the second particular sequences of the predefined single character strokes comprises two predefined single character strokes.

5. An electronic device capable of processing an ideographic character, the electronic device comprising:
   a processor;
   a numeric keypad for entering ideographic characters, the numeric keypad having a first set of input keys corresponding to numerals 1, 2, 3, 4, and 5, each of the first set of input keys entering a predefined single character stroke into the processor, and having a second set of input keys corresponding to numeral 6, 7, 8, 9, and 0,
   wherein at least one of the second set of input keys is assigned a first particular sequence of the predefined single character strokes and a second particular sequence of the predefined single character strokes different from the first particular sequence of the predefined single character strokes and wherein the at least one of the second input keys enters either the first or the second particular sequence into the processor.

6. The electronic device of claim 5, wherein each of the first particular sequence and the second particular sequence of the predefined single character strokes comprises two predefined single character strokes.

7. The electronic device of claim 5, wherein each of the second set of input keys is assigned a first particular sequence of the predefined single character strokes and a second particular sequence of the predefined single character strokes,
   wherein each of the first particular sequences and the second particular sequences of the predefined single character strokes is unique.

8. The electronic device of claim 7, wherein each of the first particular sequences and the second particular sequences of the predefined single character strokes comprises two predefined single character strokes.

9. A method for programming keys in an electronic device for entering an ideographic character using a numeric keypad, the numeric keypad having a first set of input keys corresponding to numerals 1, 2, 3, 4, and 5 and a second set of input keys corresponding to numerals 6, 7, 8, 9, and 0, the method comprising:
   assigning each of the first set of input keys with a predefined single character stroke; and
   assigning at least one of the second set of input keys with a first particular sequence of the predefined single character strokes and a second particular sequence of the predefined single character strokes different from the first particular sequence of the predefined single character strokes.

10. The method of claim 9, wherein each of the first particular sequence and the second particular sequence of the predefined single character strokes comprises two predefined single character strokes.

11. The method of claim 9, wherein each of the second set of input keys is assigned a first particular sequence of the predefined single character strokes and a second particular sequence of the predefined single character strokes,
   wherein each of the first particular sequences and the second particular sequences of the predefined single character strokes is unique.

12. The method of claim 11, wherein each of the first particular sequences and the second particular sequences of the predefined single character strokes comprises two predefined single character strokes.

* * * * *